United States Patent
Onishi et al.

(10) Patent No.: US 8,906,314 B2
(45) Date of Patent: Dec. 9, 2014

(54) BUBBLE COLUMN REACTOR AND METHOD OF CONTROLLING BUBBLE COLUMN REACTOR

(75) Inventors: Yasuhiro Onishi, Tokyo (JP); Yuzuru Kato, Tokyo (JP); Eiichi Yamada, Tokyo (JP); Atsushi Murata, Tokyo (JP); Osamu Wakamura, Tokyo (JP)

(73) Assignees: Japan Oil, Gas and Metals National Corporation, Kanagawa (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP)

( * ) Notice: Subject to any disclaimer, the term of this patent is extended or adjusted under 35 U.S.C. 154(b) by 522 days.

(21) Appl. No.: 12/998,203

(22) PCT Filed: Sep. 25, 2009

(86) PCT No.: PCT/JP2009/004876
§ 371 (c)(1),
(2), (4) Date: Jun. 13, 2011

(87) PCT Pub. No.: WO2010/038392
PCT Pub. Date: Apr. 8, 2010

(65) Prior Publication Data
US 2011/0245356 A1    Oct. 6, 2011

(30) Foreign Application Priority Data

Sep. 30, 2008  (JP) ................................. 2008-254813
Sep. 30, 2008  (JP) ................................. 2008-254814

(51) Int. Cl.
*B01J 8/22* (2006.01)
*C07C 1/04* (2006.01)
*C10G 2/00* (2006.01)

(52) U.S. Cl.
CPC  *C10G 2/342* (2013.01); *C10G 2/32* (2013.01); *B01J 2219/00006* (2013.01); *B01J 2208/0061* (2013.01); *B01J 2208/00548* (2013.01); *B01J 2208/00141* (2013.01); *B01J 8/22* (2013.01)
USPC ........... 422/140; 422/224; 422/231; 422/198; 422/110; 518/700

(58) Field of Classification Search
CPC ....................................................... C10G 2/344
USPC ........... 422/140, 224, 231, 198, 110; 518/700
See application file for complete search history.

(56) References Cited

U.S. PATENT DOCUMENTS

| 1,846,248 | A |   | 2/1932 | Clarke |         |
|-----------|---|---|--------|--------|---------|
| 5,384,336 | A | * | 1/1995 | Koros  | 518/700 |

(Continued)

FOREIGN PATENT DOCUMENTS

| CN | 1600419      | 3/2005 |
| DE | 4201033      | 7/1993 |
| JP | 2007-197405  | 8/2007 |

OTHER PUBLICATIONS

Chinese Office Action dated Apr. 2, 2013, issued in corresponding Chinese application No. 200980138041.4, and an English translation of the search report only.

(Continued)

*Primary Examiner* — Lessanework Seifu
(74) *Attorney, Agent, or Firm* — Kenyon & Kenyon LLP

(57) ABSTRACT

A bubble column reactor includes a reactor body which contains a slurry having solid catalyst particles suspended in a liquid, an inflow port which is provided at the bottom of the reactor body and allows a synthesis gas including a carbon monoxide gas and a hydrogen gas as the main components to flow into the slurry therethrough, and an outflow port which is provided at the top of the reactor body and allows gaseous hydrocarbons synthesized by a chemical reaction between the synthesis gas and the slurry, an unreacted synthesis gas, and the like to flow out therethrough. The distance in a vertical direction between the liquid surface of the slurry and the outflow port is 1.4 m or more and 10 m or less.

5 Claims, 4 Drawing Sheets

(56) References Cited

U.S. PATENT DOCUMENTS 6,322,755 B1 * 11/2001 Hoek et al. .................. 422/140
6,462,098 B1 * 10/2002 Vogel et al. .................. 518/700

OTHER PUBLICATIONS

International Search Report dated Oct. 27, 2009 issued in corresponding PCT Application No. PCT/JP2009/004876.

Krishna et al., "Design and scale up of a bubble column slurry reator for Fischer-Tropsch synthesis", Chemical Engineering Science, 56 (2), p. 537-545 (2001).

Davis, "Overview of reactors for liquid phase Fischer-Tropsch synthesis", Catalysis Today, 71(3-4), p. 249-300 (2002).

Behkish et al., "Gas holdup and bubble size behavior in a large-scale slurry bubble column reactor operating with an organic liquid under elevated pressures and temperatures", Chemical Engineering Jounal, 128 (2-3), p. 69-84 (2007).

* cited by examiner

US 8,906,314 B2

BUBBLE COLUMN REACTOR AND METHOD OF CONTROLLING BUBBLE COLUMN REACTOR

TECHNICAL FIELD

The present invention relates to a bubble column reactor which synthesizes hydrocarbons by a chemical reaction using a catalyst, and a method of controlling the bubble column reactor.

This application is a national stage application of International Application No. PCT/JP2009/004876, filed Sep. 25, 2009, which claims priority to Japanese Patent Application Nos. 2008-254813, filed Sep. 30, 2008, and 2008-254814, filed Sep. 30, 2008, the content of which are incorporated herein by reference.

BACKGROUND ART

In recent years, as a method of synthesizing liquid fuels from a natural gas, a liquid-fuel synthesizing system using a bubble column reactor has been developed. In this liquid-fuel synthesizing system, a GTL (Gas To Liquids: liquid fuel synthesis) technique of reforming a natural gas to produce a synthesis gas containing a hydrogen gas ($H_2$) and a carbon monoxide gas (CO) as the main components, synthesizing hydrocarbons using a catalyst with this synthesis gas as a source gas by the Fischer-Tropsch synthesis reaction (hereinafter referred to as "FT synthesis reaction"), and further hydrogenating and fractionating the hydrocarbons to produce liquid fuel products, such as naphtha (raw gasoline), kerosene, gas oil, and wax, has been used.

In the bubble column reactor, for example, as shown in Patent Document 1, a synthesis gas is blown into the reactor from the bottom of a slurry including a catalyst, and the synthesis gas rises through the slurry in the form of bubbles. Then, the synthesis gas is dissolved in a liquid of the slurry while rising through the slurry, and comes into contact with the catalyst particles to undergo the FT synthesis reaction, thereby producing gaseous or liquid hydrocarbons.

CITATION LIST

Patent Document

[Patent Document 1] Japanese Patent Unexamined Publication No. 2007-197405

SUMMARY OF THE INVENTION

Problem that the Invention is to Solve

Here, in general, a synthesis gas which have not reacted within the bubble column reactor, gaseous hydrocarbons, and the like flow out from the top of the bubble column reactor so as to be separated. The unreacted synthesis gas and the like are blown again into the bubble column reactor, and the gaseous hydrocarbons are cooled down and liquefied in the downstream process so as to become liquid fuels.

However, since catalyst particles with a small particle diameter are used in order to obtain a good fluidization and mixing state of the slurry, the catalyst particles are entrained upward from the liquid surface of the slurry together with the unreacted synthesis gas, the gaseous hydrocarbons, and the like so as to be discharged from a gas discharge port through the top of the bubble column reactor, and the gaseous hydrocarbons are liquefied while the catalyst particles are mixed thereinto, thereby causing a problem in that the quality of the products deteriorates, and retention and blocking occur within instruments and pipes.

The present invention is contrived in consideration of the above-described problems, and the object of the present invention is to provide a bubble column reactor which suppresses catalyst particles from being entrained into the gaseous hydrocarbons which flow out.

Means for Solving the Problem

According to a first aspect of the present invention, there is provided a bubble column reactor including a reactor body which contains a slurry having solid catalyst particles suspended in a liquid; an inflow port which is provided at the bottom of the reactor body and allows a synthesis gas including a carbon monoxide gas and a hydrogen gas as the main components to flow into the slurry therethrough; and an outflow port which is provided at the top of the reactor body and which allows gaseous hydrocarbons synthesized by a chemical reaction between the synthesis gas and the slurry, an unreacted synthesis gas, and the like to flow out therethrough, wherein the distance in a vertical direction between the liquid surface of the slurry and the outflow port is 1.4 m or more and 10 m or less.

According to the first aspect, the synthesis gas flowing into the liquid slurry within the reactor body through the inflow port provided in the reactor body is turned into hydrocarbons by a chemical reaction with the catalyst particles included in the slurry while rising through the slurry in the form of bubbles. Although some of the catalyst particles may possibly fly out of the liquid surface of the slurry together with the synthesized gaseous hydrocarbons, the unreacted synthesis gas which has not reacted within the slurry, and the like so as to flow out of the outflow port provided at the top, the distance in a vertical direction between the liquid surface of the slurry and the outflow port is set to be 1.4 m or more and 10 m or less. By setting the distance to be 1.4 m or more, most of the catalyst particles which fly out upward fall due to the influence of the gravity acting thereon before arriving at the outflow port, and return to the slurry contained in the reactor body. Accordingly, it is possible to suppress the catalyst particles from being entrained into the hydrocarbons flowing out of the outflow port.

Further, by setting the distance to be 10 m or less, it is possible to suppress an increase in cost resulting from an increase in size of the bubble column reactor, and to prevent the difficulty upon incorporating the bubble column reactor into the liquid-fuel synthesizing system.

Further, in the above bubble column reactor, a gas superficial velocity of the synthesis gas flowing into the reactor body may be 0.04 msec or more and 0.3 msec or less.

In this case, since the velocity of the hydrocarbons flying upward out of the liquid surface of the slurry is suppressed by setting the gas superficial velocity to be 0.3 msec or less, it is possible to further reliably suppress the catalyst particles from being entrained into the hydrocarbons flowing out from the outflow port.

Further, since the superficial gas velocity is set to be 0.04 msec or more, it is possible to prevent the accumulation of the catalyst within the reactor body due to the precipitation of the catalyst particles downward in the slurry, and thus to prevent the deterioration of the efficiency of the chemical reaction between the synthesis gas and the slurry.

According to a second aspect of the present invention, there is provided a bubble column reactor including a reactor body which contains a slurry having solid catalyst particles suspended in a liquid; an inflow port which is provided at the bottom of the reactor body and allows a synthesis gas including a carbon monoxide gas and a hydrogen gas as the main components to flow into the slurry therethrough; an outflow port which is provided at the top of the reactor body and allows gaseous hydrocarbons synthesized by a chemical reaction between the synthesis gas and the slurry, an unreacted synthesis gas, and the like to flow out therethrough; and a demister which is disposed between the liquid surface of the slurry within the reactor body and the outflow port so as to capture the catalyst particles passing therethrough.

According to the second aspect, the synthesis gas flowing into the slurry including a catalyst within the reactor body through the inflow port provided in the reactor body is turned into hydrocarbons by a chemical reaction with the catalyst particles included in the slurry while rising through the slurry in the form of bubbles. Although some of the catalyst particles may possibly fly upward out of the liquid surface of the slurry together with the synthesized gaseous hydrocarbons, the unreacted synthesis gas which has not reacted within the slurry, and the like so as to flow out of the outflow port provided at the top, since the demister is provided between the slurry and the outflow port, the catalyst particles are captured by the demister upon passing therethrough. Accordingly, it is possible to suppress the catalyst particles from mixing into the hydrocarbons flowing out of the outflow port.

Further, in the above bubble column reactor, the demister may include a self heating device.

In this case, for example, even when the slurry including the catalyst adheres to the demister and is cooled down and solidified, the adhered slurry may be heated and melted by the heating device so as to be dropped and returned to the liquid slurry contained in the reactor body. Accordingly, it is possible to prevent the slurry from being solidified to block the demister and to prevent the flow of the gaseous hydrocarbons from being stopped.

Further, in the bubble column reactor, the heating device may include a heating tube of which at least a part is disposed within the demister and a heating medium flowing device for supplying a heating medium used for heating the heating tube into the heating tube.

In this case, since the heating tube is disposed within the demister, it is possible to further reliably heat the demister by allowing the heating medium to flow into the heating tube. Further, for example, by flowing a steam generated in the process of performing the heat exchange with the slurry heated by the FT synthesis reaction that is an exothermic reaction into the heating tube, it is possible to efficiently heat the demister.

Further, in the above bubble column reactor, a gas superficial velocity of the synthesis gas flowing into the reactor body may be 0.04 msec or more and 0.3 msec or less.

In this case, since the velocity of the hydrocarbons flying upward out of the liquid surface of the slurry is suppressed by setting the gas superficial velocity to be 0.3 msec or less, it is possible to further reliably suppress the catalyst particles from being entrained into the hydrocarbons flowing out from the outflow port. Further, since the gas superficial velocity is set to be 0.04 msec or more, it is possible to prevent the accumulation of the catalyst inside the reactor body due to the precipitation of the catalyst particles downward in the slurry, and thus to prevent the deterioration of the efficiency of the chemical reaction between the synthesis gas and the slurry.

Further, the method of controlling a bubble column reactor according to the present invention is a method of controlling a bubble column reactor including a reactor body which contains a slurry having solid catalyst particles suspended in a liquid; an inflow port which is provided in the reactor body and allows a synthesis gas including a carbon monoxide gas and a hydrogen gas as the main components to flow into the slurry therethrough; and an outflow port which is provided at the top of the reactor body and allows gaseous hydrocarbons synthesized by a chemical reaction between the synthesis gas and the slurry, an unreacted synthesis gas, and the like to flow out therethrough. The method includes the step of reducing the amount of the slurry contained in the reactor body when the distance in a vertical direction between the liquid surface of the slurry and the outflow port is less than 1.4 m.

According to the present invention, the synthesis gas flowing into the liquid slurry within the reactor body through the inflow port is turned into hydrocarbons by a chemical reaction with the catalyst particles included in the slurry while rising through the slurry in the form of bubbles. Although the synthesized gaseous hydrocarbons and the unreacted synthesis gas which has not reacted within the slurry fly upward out of the upper surface of the slurry together with the catalyst particles, when the distance in a vertical direction between the liquid level and the outflow port is less than 1.4 m, the distance is controlled to become 1.4 m or more by reducing the amount of the slurry contained in the reactor body, i.e., by lowering the liquid surface of the slurry to a predetermined position. Accordingly, most of the catalyst particles which fly out upward fall due to the influence of the gravity acting thereon before arriving at the outflow port, and return to the slurry contained in the reactor body. Accordingly, it is possible to suppress the catalyst particles from being entrained into the hydrocarbons flowing out of the outflow port.

Advantage of the Invention

According to the bubble column reactor and the method of controlling the bubble column reactor according to the present invention, it is possible to suppress the catalyst particles from being mixed into the gaseous hydrocarbons which flow to the outside.

Further, by heating the demister by the heating device, it is possible to prevent the slurry from being solidified to block the demister and to prevent the flow of the gaseous hydrocarbons from being stopped.

DESCRIPTION OF EMBODIMENTS

First Embodiment

Hereinafter, a bubble column reactor according to a first embodiment of the present invention and a liquid-fuel synthesizing system using the bubble column reactor will be described with reference to FIGS. 1 and 2.

Figure 1:
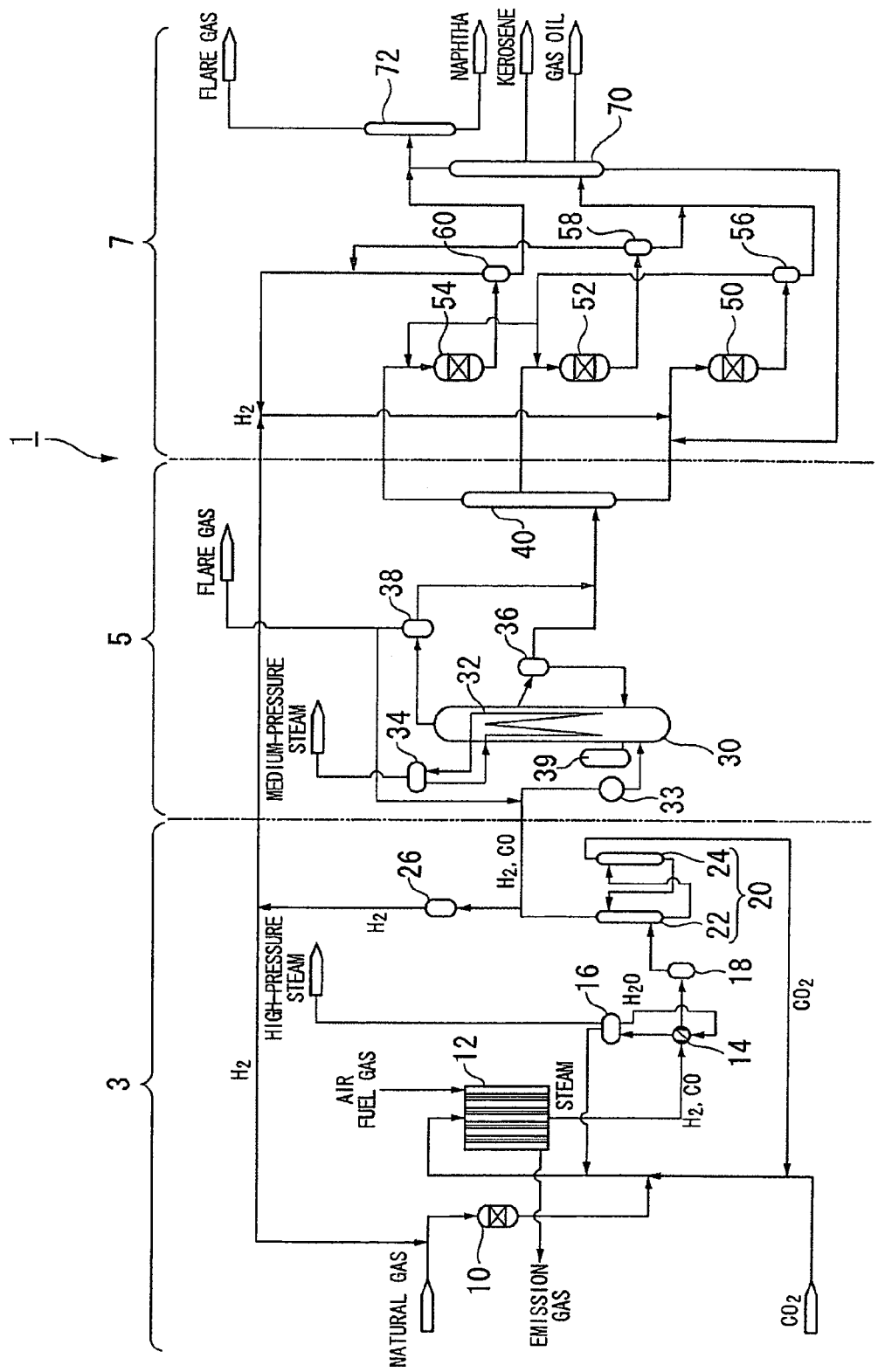
FIG. 1 is a schematic diagram showing the overall configuration of a liquid-fuel synthesizing system using a bubble column reactor according to a first embodiment of the present invention.
Figure 2:
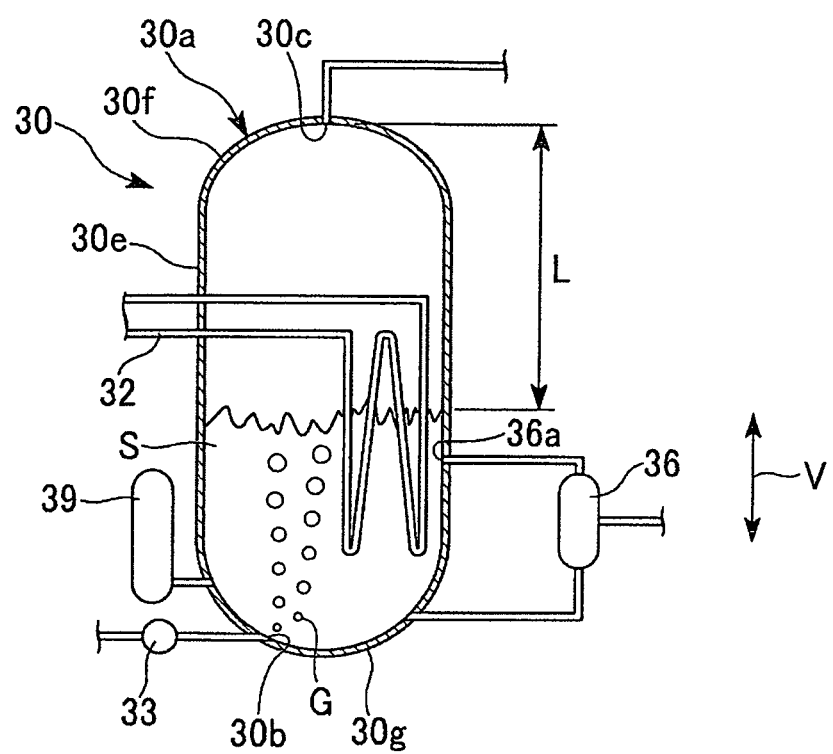
FIG. 2 is a partial sectional view showing the overall configuration of the bubble column reactor according to the first embodiment of the present invention.

FIG. 1 is a schematic diagram showing the overall configuration of the liquid-fuel synthesizing system 1, and FIG. 2 is a partial sectional view showing the overall configuration of a bubble column reactor 30.

As shown in FIG. 1, the liquid-fuel synthesizing system 1 is a plant facility which carries out the GTL process which converts a hydrocarbon feedstock, such as a natural gas, into liquid fuels. This liquid-fuel synthesizing system 1 includes a synthesis gas production unit 3, an FT synthesis unit 5, and an upgrading unit 7. The synthesis gas production unit 3 reforms a natural gas, which is a hydrocarbon feedstock, to produce a synthesis gas including a carbon monoxide gas and a hydrogen gas as the main components. The FT synthesis unit 5 produces hydrocarbons from the produced synthesis gas by the FT synthesis reaction. The upgrading unit 7 hydrogenates and refines the liquid hydrocarbons produced by the FT synthesis reaction to produce liquid fuel products (naphtha, kerosene, gas oil, wax, etc.). Hereinafter, components of these respective units will be described.

First, the synthesis gas production unit 3 will be described. The synthesis gas production unit 3 mainly includes, for example, a desulfurizing reactor 10, a reformer 12, a waste heat boiler 14, vapor-liquid separators 16 and 18, a $CO_2$ removal unit 20, and a hydrogen separator 26.

The desulfurizing reactor 10 is composed of a hydrodesulfurizer, etc., and removes sulfur components from a natural gas as a feedstock. The reformer 12 reforms the natural gas supplied from the desulfurizing reactor 10, to produce a synthesis gas including a carbon monoxide gas (CO) and a hydrogen gas ($H_2$) as the main components. The waste heat boiler 14 recovers waste heat of the synthesis gas produced in the reformer 12, to produce a high-pressure steam. The vapor-liquid separator 16 separates the water heated by heat exchange with the synthesis gas in the waste heat boiler 14 into a vapor (high-pressure steam) and a liquid. The vapor-liquid separator 18 removes a condensate from the synthesis gas cooled down in the waste heat boiler 14, and supplies a gas component to the $CO_2$ removal unit 20. The $CO_2$ removal unit 20 has an absorption tower 22 which removes a carbon dioxide gas by using an absorbent from the synthesis gas supplied from the vapor-liquid separator 18, and a regeneration tower 24 which desorbs the carbon dioxide gas and regenerates the absorbent including the carbon dioxide gas. The hydrogen separator 26 separates a portion of the hydrogen gas included in the synthesis gas, the carbon dioxide gas of which has been separated by the $CO_2$ removal unit 20. It is to be noted herein that the above $CO_2$ removal unit 20 is not necessarily provided depending on circumstances.

Among them, the reformer 12 reforms a natural gas by using a carbon dioxide and a steam to produce a high-temperature synthesis gas including a carbon monoxide gas and a hydrogen gas as the main components, by a steam and carbon-dioxide-gas reforming method expressed by the following chemical reaction formulas (1) and (2). In addition, the reforming method in this reformer 12 is not limited to the example of the above steam and carbon-dioxide-gas reforming method. For example, a steam reforming method, a partial oxidation reforming method (POX) using oxygen, an autothermal reforming method (ATR) that is a combination of the partial oxidation method and the steam reforming method, a carbon-dioxide-gas reforming method, and the like can also be utilized.

$$CH_4 + H_2O \rightarrow CO + 3H_2 \quad (1)$$

$$CH_4 + CO_2 \rightarrow 2CO + 2H_2 \quad (2)$$

Further, the hydrogen separator 26 is provided on a line branched from a main pipe which connects the $CO_2$ removal unit 20 or the vapor-liquid separator 18 with the bubble column reactor 30. This hydrogen separator 26 can be composed of, for example, a hydrogen PSA (Pressure Swing Adsorption) device which performs adsorption and desorption of hydrogen by using a pressure difference. This hydrogen PSA device has adsorbents (zeolitic adsorbent, activated carbon, alumina, silica gel, etc.) within a plurality of adsorption towers (not shown) which are arranged in parallel. By sequentially repeating processes including pressurizing, adsorption, desorption (pressure reduction), and purging of hydrogen in each of the adsorption towers, a high-purity (for example, about 99.999%) hydrogen gas separated from the synthesis gas can be continuously supplied.

In addition, the hydrogen gas separating method in the hydrogen separator 26 is not limited to the example of the pressure swing adsorption method as in the above hydrogen PSA device. For example, there may be a hydrogen storing alloy adsorption method, a membrane separation method, or a combination thereof.

The hydrogen storing alloy method is, for example, a technique of separating a hydrogen gas using a hydrogen storing alloy (TiFe, LaNi$_5$, TiFe$_{0.7\ to\ 0.9}$, Mn$_{0.3\ to\ 0.1}$, TiMn$_{1.5}$, etc.) having a property which adsorbs or emits a hydrogen by being cooled or heated. By providing a plurality of adsorption towers in which a hydrogen storing alloy is contained, and alternately repeating, in each of the adsorption towers, adsorption of a hydrogen by cooling the hydrogen storing alloy and emission of a hydrogen by heating the hydrogen storing alloy, a hydrogen gas in the synthesis gas can be separated and recovered.

Further, the membrane separation method is a technique of separating a hydrogen gas having excellent membrane permeability out of a mixed gas, using a membrane made of a polymeric material, such as aromatic polyimide. Since this membrane separation method is not accompanied by a phase change, it requires less energy to run, and the running cost is low. Further, since the structure of a membrane separation device is simple and compact, the necessary facility cost is low and it does not require such a large facility area. Moreover, since there is no driving device in a separation membrane, and the stable running range is wide, there is an advantage that maintenance and management are easy.

Next, the FT synthesis unit 5 will be described. As shown in FIGS. 1 and 2, the FT synthesis unit 5 mainly includes, for example, a flow rate control device 33, the bubble column reactor 30, a vapor-liquid separator 34, a separator 36, a vapor-liquid separator 38, and a first fractionator 40. The flow rate control device 33 adjusts the flow rate of a synthesis gas G which flows into the bubble column reactor 30 to be constant. The bubble column reactor 30 produces hydrocarbons by allowing the synthesis gas produced by the synthesis gas production unit 3 to be subjected to the FT synthesis reaction with catalyst particles included in the slurry contained therein, and is provided with a liquid level gage 39 which will be described later. The vapor-liquid separator 34 separates the water flowed and heated through a heat transfer tube 32 disposed in the bubble column reactor 30 into a steam (medium-pressure steam) and a liquid. The separator 36 is connected to the middle part of the bubble column reactor 30, and separates the slurry including the catalyst particles, and the liquid hydrocarbon product. The vapor-liquid separator 38 is connected to the bubble column reactor 30, and cools down an unreacted synthesis gas and a gaseous hydrocarbon product, returns the unreacted synthesis gas to the bubble column reactor 30, and cools down the gaseous hydrocarbon product into a liquid. The first fractionator 40 distills the liquid hydrocarbons supplied via the separator 36 and the vapor-liquid separator 38 from the bubble column reactor 30, and separates and refines the liquid hydrocarbons into individual fractions according to boiling points.

In addition, a buffer device, which has a tank temporarily storing a slurry therein and which adjusts the amount of the slurry contained in the bubble column reactor 30, may be provided outside the bubble column reactor 30.

Among them, the bubble column reactor 30 functions as an FT synthesis reactor which synthesizes hydrocarbons by the FT synthesis reaction between the synthesis gas and the slurry having solid catalyst particles suspended in a liquid.

As shown in FIG. 2, the bubble column reactor 30 includes a reactor body 30a which contains the slurry S, an inflow port 30b which is provided at the bottom of the reactor body 30a and allows the synthesis gas G to flow into the slurry S therethrough, and an outflow port 30c which is provided at the top of the reactor body 30a and allows the gaseous hydrocarbons, the unreacted synthesis gas, and the like, to flow out of the reactor body 30a therethrough. The reactor body 30a includes a cylindrical body part 30e which has a circular cross-section, and substantially semispherical upper and lower lid parts 30f and 30g which are respectively provided so as to be connected to both ends of the body part 30e.

As such, in the reactor body 30a, the inflow port 30b is disposed at the bottom of the lower lid part 30g disposed on the lower side, and the outflow port 30c is disposed at the top of the upper lid part 30f disposed on the upper side. For example, the synthesis gas G from which a carbon dioxide gas is removed is supplied to the inflow port 30b from the $CO_2$ removal unit 20, and the aforementioned vapor-liquid separator 38 is connected to the outflow port 30c.

The liquid level gauge 39 detects the position of an upper portion of the slurry S contained in the bubble column reactor 30, that is, the height of the liquid surface of the slurry S.

Here, the synthesis gas G made to flow into the slurry S by the aforementioned flow rate control device 33 is evaluated by a gas superficial velocity hereinafter. In this embodiment, the cross-section of the body part 30e is circular.

In addition, the slurry mainly includes liquid hydrocarbons which are produced by the FT synthesis reaction with the catalyst particles, and the liquid hydrocarbons include a wax fraction which is solidified at a specific temperature or lower.

In this bubble column reactor 30, the synthesis gas G that is a source gas is supplied in the form of bubbles from the inflow port 30b of the bubble column reactor 30, and passes through the slurry S, and in a suspended state, a hydrogen gas and a carbon monoxide gas undergo a synthesis reaction, as shown in the following chemical reaction formula (3).

$$2nH_2 + nCO \rightarrow (-CH_2-)_n + nH_2O \quad (3)$$

Since this FT synthesis reaction is an exothermic reaction, the bubble column reactor 30, which is a heat exchanger type reactor within which the heat transfer tube 32 is disposed, is adapted such that, for example, water (BFW: Boiler Feed Water) is supplied as a coolant so that the reaction heat of the above FT synthesis reaction can be recovered as, for example, a medium-pressure steam by heat exchange between the slurry and water.

Finally, the upgrading unit 7 will be described. As shown in FIG. 1, the upgrading unit 7 includes, for example, a wax fraction hydrocracking reactor 50, a kerosene and gas oil fraction hydrotreating reactor 52, a naphtha fraction hydrotreating reactor 54, vapor-liquid separators 56, 58 and 60, a second fractionator 70, and a naphtha stabilizer 72. The wax fraction hydrocracking reactor 50 is connected to the bottom of the first fractionator 40. The kerosene/gas oil fraction hydrotreating reactor 52 is connected to a middle part of the first fractionator 40. The naphtha fraction hydrotreating reactor 54 is connected to an upper part of the first fractionator 40. The vapor-liquid separators 56, 58 and 60 are provided so as to correspond to the hydrogenation reactors 50, 52 and 54, respectively. The second fractionator 70 separates and refines the liquid hydrocarbons supplied from the vapor-liquid separators 56 and 58 according to boiling points. The naphtha stabilizer 72 distills liquid hydrocarbons of a naphtha fraction supplied from the vapor-liquid separator 60 and the second fractionator 70, to discharge butane and components lighter than butane as a flare gas, and to separate and recover components having a carbon number of five or more as a naphtha product.

Next, a process (GTL process) of synthesizing liquid fuels from a natural gas by the liquid-fuel synthesizing system 1 configured as above will be described.

A natural gas (whose main component is $CH_4$) as a hydrocarbon feed stock is supplied to the liquid-fuel synthesizing system 1 from an external natural gas supply source (not shown), such as a natural gas field or a natural gas plant. The above synthesis gas production unit 3 reforms this natural gas to produce a synthesis gas (mixed gas including a carbon monoxide gas and a hydrogen gas as the main components).

Specifically, first, the above natural gas is supplied to the desulfurizing reactor 10 along with the hydrogen gas separated by the hydrogen separator 26. The desulfurizing reactor 10 hydrogenates and desulfurizes sulfur components included in the natural gas using the hydrogen gas, with, for example, a ZnO catalyst. By desulfurizing the natural gas in advance in this way, it is possible to prevent deactivation of catalysts used in the reformer 12, the bubble column reactor 30, etc. by sulfur components.

The natural gas (may also contain a carbon dioxide) desulfurized in this way is supplied to the reformer 12 after the carbon dioxide ($CO_2$) gas supplied from a carbon-dioxide supply source (not shown) and the steam generated in the waste heat boiler 14 are mixed therewith. The reformer 12 reforms the natural gas by using a carbon dioxide and a steam to produce a high-temperature synthesis gas including a carbon monoxide gas and a hydrogen gas as the main components, by the above steam and carbon-dioxide-gas reforming method. At this time, the reformer 12 is supplied with, for example, a fuel gas for a burner disposed in the reformer 12 and air, and a reaction heat required for the above steam and $CO_2$ reforming reaction, which is an endothermic reaction is provided with the heat of combustion of the fuel gas in the burner.

The high-temperature synthesis gas (for example, 900° C., 2.0 MPaG) produced in the reformer 12 in this way is supplied to the waste heat boiler 14, and is cooled down by the heat exchange with the water which flows through the waste heat boiler 14 (for example, 400° C.), thus the waste heat is recovered. At this time, the water heated by the synthesis gas in the waste heat boiler 14 is supplied to the vapor-liquid separator 16. From this vapor-liquid separator 16, a gas component is supplied to the reformer 12 or other external devices as a high-pressure steam (for example, 3.4 to 10.0 MPaG), and water as a liquid component is returned to the waste heat boiler 14.

Meanwhile, the synthesis gas cooled down in the waste heat boiler 14 is supplied to the absorption tower 22 of the $CO_2$ removal unit 20, or the bubble column reactor 30, after a condensate is separated and removed from the synthesis gas in the vapor-liquid separator 18. The absorption tower 22 absorbs a carbon dioxide gas included in the synthesis gas into the retained absorbent, to separate the carbon dioxide gas from the synthesis gas. The absorbent including the carbon dioxide gas within this absorption tower 22 is introduced into the regeneration tower 24, the absorbent including the carbon dioxide gas is heated and subjected to stripping treatment with, for example, a steam, and the resulting desorbed carbon dioxide gas is recycled to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio suitable for the FT synthesis reaction (for example, $H_2$:CO=2:1 (molar ratio)). In addition, the pressure of the synthesis gas supplied to the bubble column reactor 30 is raised to a pressure suitable for the FT synthesis reaction (for example, about 3.6 MPaG) by a compressor (not shown) provided in a pipe which connects the $CO_2$ removal unit 20 with the bubble column reactor 30.

Further, a portion of the synthesis gas, the carbon dioxide gas of which has been separated by the above $CO_2$ removal unit 20, is also supplied to the hydrogen separator 26. The hydrogen separator 26 separates the hydrogen gas included in the synthesis gas, by the adsorption and desorption (hydrogen PSA) utilizing a pressure difference as described above. This separated hydrogen is continuously supplied from a gas holder (not shown), etc. via a compressor (not shown) to various hydrogen-utilizing reaction devices (for example, the desulfurizing reactor 10, the wax fraction hydrocracking reactor 50, the kerosene and gas oil fraction hydrotreating reactor 52, the naphtha fraction hydrotreating reactor 54, etc.) which perform predetermined reactions utilizing a hydrogen within the liquid fuel synthesizing system 1.

Next, the above synthesis reaction unit 5 synthesizes liquid hydrocarbons by the FT synthesis reaction from the synthesis gas produced in the above synthesis gas production unit 3.

Specifically, as shown in FIG. 2, the synthesis gas G from which the carbon dioxide gas is separated in the $CO_2$ removal unit 20 flows into the inflow port 30b provided at the bottom of the reactor body 30a of the bubble column reactor 30 through the flow rate control device 33, and rises in the form of bubbles through the liquid slurry S contained within the reactor body 30a. At this time, the gas superficial velocity of the synthesis gas G is adjusted by the flow rate control device 33 so as to be a predetermined value in the range of 0.04 m/sec or more and 0.3 msec or less. In addition, it is more preferable that the gas superficial velocity is 0.1 msec or more and 0.2 msec or less. Within the reactor body 30a, the carbon monoxide gas and hydrogen gas which are included in the synthesis gas G react with each other by the above-described FT synthesis reaction, thereby producing gaseous or liquid hydrocarbons.

Here, the position of the liquid surface of the slurry S is always detected by the liquid level gauge 39. A distance L in a vertical direction V between the liquid surface of the slurry S and the outflow port 30c is controlled to be 1.4 m or more, and the liquid surface of the slurry S is controlled to be located above an outlet 36a of a pipe facing the separator 36. That is, when the distance L is smaller than 1.4 m, the amount of the slurry S contained in the reactor body 30a may be reduced in such a manner that the flow rate of the slurry S flowing out to the separator 36 is temporarily increased or the gas superficial velocity is reduced. Further, a part of the slurry S may be temporarily brought into the aforementioned buffer device provided outside the reactor body 30a. When the liquid surface of the slurry S comes below the outlet 36a, the position of the liquid surface of the slurry S may be raised up in such a manner that the flow rate of the slurry S flowing out to the separator 36 is temporarily reduced or the gas superficial velocity is increased. Further, the slurry S kept in the aforementioned buffer device provided outside the reactor body 30a may be supplied to the reactor body 30a.

The catalyst particles included in the slurry S fly upward out of the liquid surface of the slurry S together with minute liquid droplets which are generated when the bubbles composed of the unreacted synthesis gas G which has not reacted within the slurry, the synthesized gaseous hydrocarbons, and the like burst. However, since the gas superficial velocity of the synthesis gas G and the distance L are adjusted as described above, most of the catalyst particles which fly out upward fall due to the influence of the gravity acting thereon before arriving at the outflow port 30c, and return to the slurry S contained in the reactor body 30a.

Moreover, by flowing water through the heat transfer tube 32 of the bubble column reactor 30 at the time of this synthesis reaction, the reaction heat of the FT synthesis reaction is removed, and the water heated by this heat exchange is vaporized into a steam. As for this steam, the water liquefied in the vapor-liquid separator 34 is returned to the heat transfer tube 32, and a gas component is supplied to an external device as a medium-pressure steam (for example, 1.0 to 2.5 MPaG).

The liquid hydrocarbons synthesized in the bubble column reactor 30 in this way are extracted from the middle part of the bubble column reactor 30, and are brought into the separator 36. The separator 36 separates the slurry including the catalyst particles and the liquid hydrocarbon product. The separated slurry is returned to the bubble column reactor 30, and the liquid hydrocarbon product is supplied to the first fractionator 40. From the outflow port 30c provided at the top of the bubble column reactor 30, the unreacted synthesis gas, the gas component of the synthesized hydrocarbons, and the like are introduced into the vapor-liquid separator 38. The vapor-liquid separator 38 cools down these gases to separate some condensed liquid hydrocarbons to introduce them into the first fractionator 40. Meanwhile, as for the gas component separated in the vapor-liquid separator 38, the unreacted synthesis gases (CO and $H_2$) is returned to the bottom of the bubble column reactor 30, and is reused for the FT synthesis reaction. Further, the emission gas (flare gas) other than the target products, including as the main component hydrocarbon gas having a small carbon number ($C_4$ or less), is introduced into an external combustion facility (not shown), is combusted therein, and is then emitted to the atmosphere.

Next, the first fractionator 40 heats the liquid hydrocarbons (whose carbon numbers are various) supplied via the separator 36 and the vapor-liquid separator 38 from the bubble column reactor 30 as described above, to fractionally distill the liquid hydrocarbons using a difference in boiling points. Thereby, the first fractionator 40 separates and refines the liquid hydrocarbons into a naphtha fraction (whose boiling point is lower than about 150° C.), a kerosene and gas oil fraction (whose boiling point is about 150 to 350° C.), and a wax fraction (whose boiling point is higher than about 350° C.). The liquid hydrocarbons (mainly $C_{21}$ or more) as the wax fraction drawn from the bottom of the first fractionator 40 are transferred to the wax fraction hydrocracking reactor 50, the liquid hydrocarbons (mainly $C_{11}$ to $C_{20}$) as the kerosene and gas oil fraction drawn from the middle part of the first fractionator 40 are transferred to the kerosene and gas oil fraction hydrotreating reactor 52, and the liquid hydrocarbons (mainly $C_5$ to $C_{10}$) as the naphtha fraction drawn from the upper part of the first fractionator 40 are transferred to the naphtha fraction hydrotreating reactor 54.

The wax fraction hydrocracking reactor 50 hydrocracks the liquid hydrocarbons as the wax fraction with a large carbon number (approximately $C_{21}$ or more), which has been supplied from the bottom of the first fractionator 40, by using the hydrogen gas supplied from the above hydrogen separator 26, to reduce the carbon number to $C_{20}$ or less. In this hydrocracking reaction, hydrocarbons with a small carbon number and with low molecular weight are produced by cleaving C—C bonds of hydrocarbons with a large carbon number, using a catalyst and heat. A product including the liquid hydrocarbons hydrocracked in this wax fraction hydrocracking reactor 50 is separated into a gas and a liquid in the vapor-liquid separator 56, the liquid hydrocarbons of which are transferred to the second fractionator 70, and the gas component (including hydrogen gas) of which is transferred to the kerosene/gas oil fraction hydrotreating reactor 52 and the naphtha fraction hydrotreating reactor 54.

The kerosene and gas oil fraction hydrotreating reactor 52 hydrotreats liquid hydrocarbons as the kerosene and gas oil fractions having a substantially middle carbon number (approximately $C_{11}$ to $C_{20}$), which have been supplied from the middle part of the first fractionator 40, by using the hydrogen gas supplied via the wax fraction hydrocracking reactor 50 from the hydrogen separator 26. In this hydrotreating reaction, in order to obtain mainly branched chain saturated hydrocarbons, the liquid hydrocarbons are isomerized, and a hydrogen is added to unsaturated bonds of the above liquid hydrocarbons to saturate them. As a result, a product including the hydrotreated liquid hydrocarbons is separated into a gas and a liquid in the vapor-liquid separator 58, the liquid hydrocarbons of which are transferred to the second fractionator 70, and the gas component (including hydrogen gas) of which is reused for the above hydrogenation reaction.

The naphtha fraction hydrotreating reactor 54 hydrotreats liquid hydrocarbons as the naphtha fraction with a low carbon number (approximately $C_{10}$ or less), which have been supplied from the upper part of the first fractionator 40, by using the hydrogen gas supplied via the wax fraction hydrocracking reactor 50 from the hydrogen separator 26. As a result, a product including the hydrotreated liquid hydrocarbons are separated into a gas and a liquid in the vapor-liquid separator 60, the liquid hydrocarbons of which are transferred to the naphtha stabilizer 72, and the gas component (including hydrogen gas) of which is reused for the above hydrogenation reaction.

Next, the second fractionator 70 distills the liquid hydrocarbons supplied from the wax fraction hydrocracking reactor 50 and the kerosene and gas oil fraction hydrotreating reactor 52 as described above. Thereby, the second fractionator 70 separates and refines the liquid hydrocarbons into hydrocarbons (whose boiling point is lower than about 150° C.) with a carbon number of $C_{10}$ or less, kerosene (whose boiling point is about 150 to 250° C.), gas oil (whose boiling point is about 250 to 350° C.), and the uncracked wax fraction (whose boiling point is higher than about 350° C.) from the wax fraction hydrocracking reactor 50. The gas oil is drawn from a lower part of the second fractionator 70, and the kerosene is drawn from a middle part thereof. Meanwhile, a hydrocarbon gas with a carbon number of $C_{10}$ or less is drawn from the top of the second fractionator 70, and is supplied to the naphtha stabilizer 72.

Moreover, the naphtha stabilizer 72 distills the hydrocarbons with a carbon number of $C_{10}$ or less, which have been supplied from the above naphtha fraction hydrotreating reactor 54 and second fractionator 70. Thereby, the naphtha stabilizer 72 separates and refines naphtha ($C_5$ to $C_{10}$) as a product. Accordingly, a high-purity naphtha is drawn from a lower part of the naphtha stabilizer 72. Meanwhile, the emission gas (flare gas) other than products, which contains as the main component hydrocarbons with a predetermined carbon number or less ($C_4$ or less), is discharged from the top of the naphtha stabilizer 72.

As such, according to the bubble column reactor 30 of the first embodiment of the present invention, the synthesis gas G, which has flown into the liquid slurry S within the reactor body 30a from the inflow port 30b provided at the bottom of the reactor body 30a, is converted into gaseous or liquid hydrocarbons by the FT synthesis reaction with the catalyst particles included in the slurry S while rising within the slurry S in the form of bubbles. Here, some of the catalyst particles may possibly fly out toward the top of the reactor body from the liquid surface of the slurry S together with the synthesis gas G which has not reacted within the slurry S, the gaseous hydrocarbons which have been synthesized within the slurry, or the like. However, since the gas superficial velocity is adjusted by the flow rate control device 33 so as to be a predetermined value in the range of 0.04 msec or more and 0.3 msec or less, the distance L in the vertical direction between the liquid surface of the slurry S and the outflow port 30c is adjusted by the liquid level gauge 39 so as to be 1.4 m or more and 10 m or less.

Since the velocity of the hydrocarbons flying upward out of the liquid surface of the slurry S is suppressed by setting the gas superficial velocity to 0.3 m/sec or less, it is possible to further reliably suppress the catalyst particles from being entrained into the hydrocarbons flowing out of the outflow port 30c. Moreover, since the gas superficial velocity is set to 0.04 msec or more, it is possible to prevent the accumulation of the catalyst within the reactor body 30a due to the precipitation of the catalyst particles downward in the slurry, and thereby to prevent the deterioration of the efficiency of the chemical reaction between the synthesis gas G and the slurry S.

In addition, since the distance L in the vertical direction between the liquid surface of the slurry S and the outflow port 30c is 1.4 m or more, most of the catalyst particles which fly out upward fall before arriving at the outflow port 30c due to the influence of the gravity acting thereon, and return to the slurry contained in the reactor body. Accordingly, it is possible to suppress the catalyst particles from being entrained into the hydrocarbons flowing out of the outflow port 30c. By setting the distance L to be 10 m or less, it is possible to suppress an increase in cost resulting from an increase in size of the bubble column reactor 30, and to prevent the difficulty upon incorporating the bubble column reactor 30 into the liquid-fuel synthesizing system 1.

Further, the distance L is preferably 1.4 m or more and 10 m or less, and more preferably 1.8 m or more and 7 m or less. By setting the distance L to 1.8 m or more, it is possible to stabilize the flow of a gas flowing out from the outflow port 30c provided at the top. Also, by setting the distance L to 7 m or less, it is possible to incorporate the bubble column reactor 30 into the liquid-fuel synthesizing system 1 regardless of the size thereof.

The results obtained by measuring the amount of the catalyst particles flowing out of the outflow port 30c of the reactor body 30a using the bubble column reactor 30 of the liquid-fuel synthesizing system 1 according to the first embodiment will be described. Table 1 shows test results in a case where the internal diameter of the body part 30e of the reactor body 30a is 250 mm.

In a working example and a comparative example, the outflow amount of the catalyst particles when the bubble column reactor 30 was operated for a predetermined period of time was measured.

TABLE 1

|  | Working example | Comparative example |
|---|---|---|
| Distance (m) | 1.4 | 0.7 |
| Operation time (h) | 98 | 72 |
| Outflow amount of catalyst particle (g) | 0.36 | 6.3 |
| Outflow amount of catalyst particle per unit time (g/h) | 0.0037 | 0.0875 |
| Concentration of catalyst in liquid hydrocarbon supplied to first fractionator (wt. ppm) | 2.1 | 50 |

As shown in the working example, when the distance L in the vertical direction V between the liquid surface of the slurry S and the outflow port 30c was 1.4 m, it was understood that the outflow amount of the catalyst particles per hour was 0.0037 g/h. On the contrary, as shown in the comparative example, when the distance L was 0.7 m, the outflow amount was increased up to 0.0875 g/h, which was twenty times of that in the example or more. When the measurement results and the calculation results are converted into the concentrations of the catalyst in the liquid hydrocarbons supplied to the first fractionator 40, it can be understood that the concentration was 2.1 wt. ppm in the working example and was 50 wt. ppm in the comparative example.

Further, when the reactor body 30a in which the test of the working example was performed is disassembled and visually observed, it was found out that the catalyst particles adhered to the inner wall surface of the body part 30e in a range up to 1.3 m high from the position of the liquid surface of the slurry S in the vertical direction V.

Although the first embodiment of the present invention has been described hitherto in detail with reference to the drawings, concrete configurations are not limited to the embodiments, and the present invention also includes changes in configuration without departing from the spirit of the present invention.

For example, although the cross-section of the body part 30e is circular in the first embodiment, the cross-section may have other shapes such as an oval shape, a quadrangular shape, and a hexagonal shape.

Further, in the first embodiment, when the distance L in the vertical direction V between the surface level of the slurry S and the outflow port 30c is smaller than 1.4 m, the amount of the slurry S contained in the reactor body 30a is reduced. However, instead of this, an alarm sound may be generated or the operation of the liquid-fuel synthesizing system 1 may be stopped.

Further, a demister may be provided between the slurry S and the outflow port 30c within the reactor body 30a so as to capture the catalyst particles passing therethrough. The demister has, for example, a structure in which a number of minute connected spaces are formed by knitting thin metallic wires.

Second Embodiment

Hereinafter, a bubble column reactor according to a second embodiment of the present invention and a liquid-fuel synthesizing system using the bubble column reactor will be described with reference to FIGS. 3 to 5.

Figure 3:
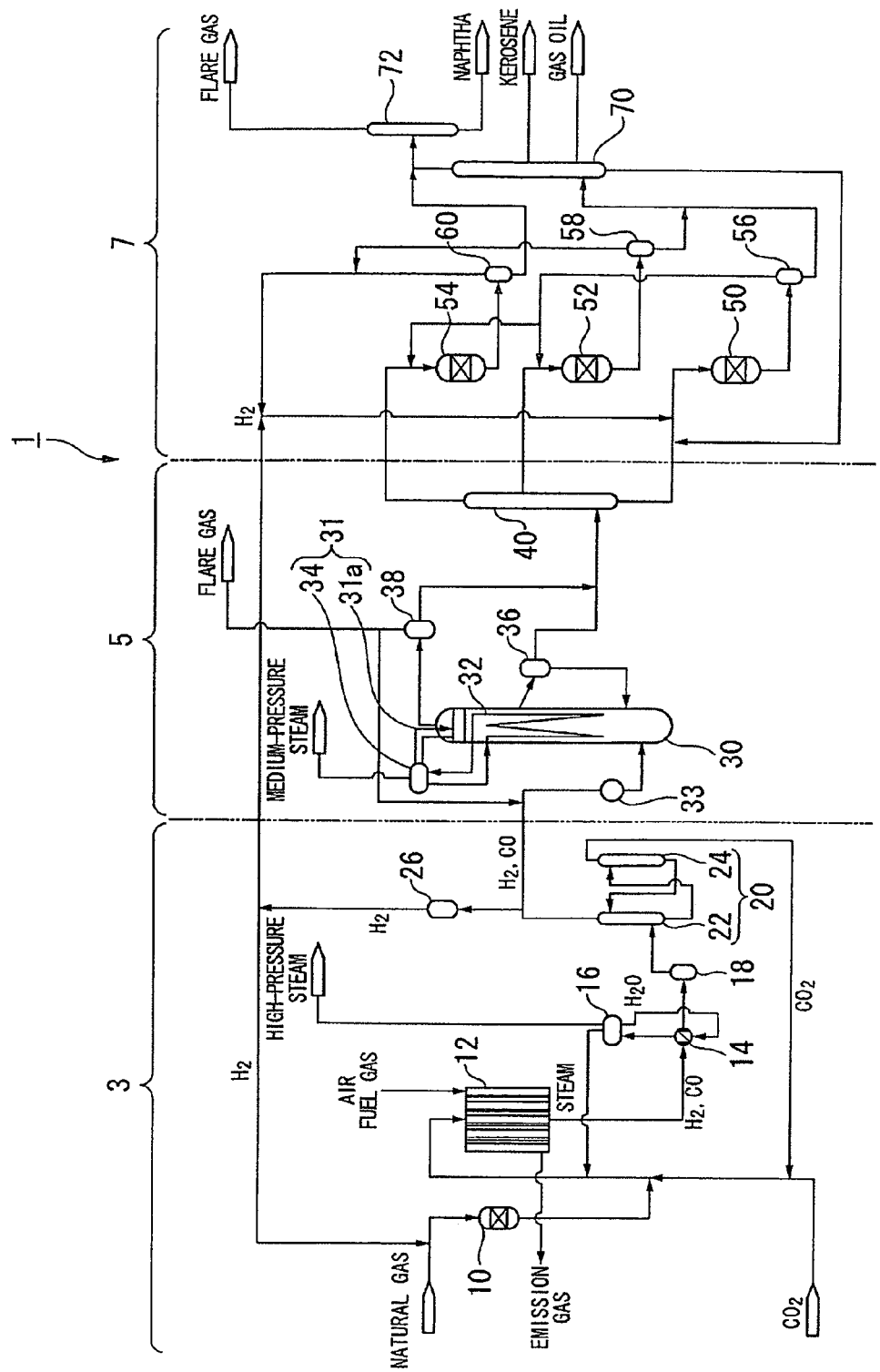
FIG. 3 is a schematic diagram showing the overall configuration of a liquid-fuel synthesizing system using a bubble column reactor according to a second embodiment of the present invention.
Figure 4:
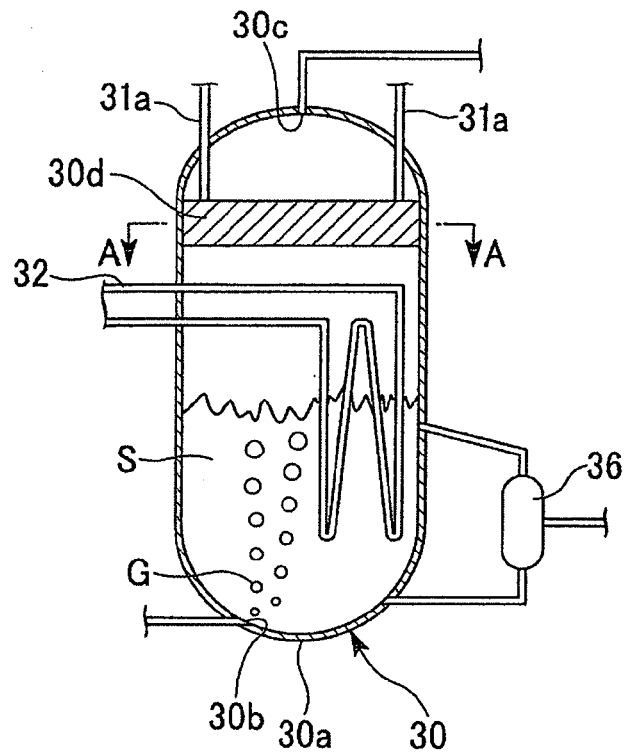
FIG. 4 is a partial sectional view showing the overall configuration of the bubble column reactor according to the second embodiment of the present invention.

FIG. 3 is a schematic diagram showing the overall configuration of the liquid-fuel synthesizing system 1, and FIG. 4 is a partial sectional view showing the overall configuration of the bubble column reactor.

As shown in FIG. 3, the liquid-fuel synthesizing system 1 is a plant facility which carries out the GTL process which converts a hydrocarbon feedstock, such as a natural gas, into liquid fuels. This liquid-fuel synthesizing system 1 includes a synthesis gas production unit 3, an FT synthesis unit 5, and an upgrading unit 7. The synthesis gas production unit 3 reforms a natural gas, which is a hydrocarbon feedstock, to produce a synthesis gas including a carbon monoxide gas and a hydrogen gas as the main components. The FT synthesis unit 5 produces hydrocarbons from the produced synthesis gas by the FT synthesis reaction. The upgrading unit 7 hydrogenates and refines the liquid hydrocarbons produced by the FT synthesis reaction to produce liquid fuel products (naphtha, kerosene, gas oil, wax, etc.). The components of the synthesis gas production unit 3 and the upgrading unit 7 are the same as those of the first embodiment. Hereinafter, the FT synthesis unit 5 having components different from those of the first embodiment will be described.

The FT synthesis unit 5 mainly includes, for example, a flow rate control device 33, the bubble column reactor 30, a vapor-liquid separator 34, a separator 36, a vapor-liquid separator 38, and a first fractionator 40. The flow rate control device 33 adjusts the flow rate of a synthesis gas which flows into the bubble column reactor 30 at a predetermined value. The bubble column reactor 30 carries out the FT synthesis reaction of the synthesis gas produced in the above synthesis gas production unit 3 to produce liquid hydrocarbons. The vapor-liquid separator 34 separates the water flowed and heated through a heat transfer tube 32 disposed in the bubble column reactor 30 into a steam (medium-pressure steam) and a liquid. The separator 36 is connected to the middle part of the bubble column reactor 30 so as to separate the catalyst particles and the liquid hydrocarbon product extracted from the bubble column reactor 30. The vapor-liquid separator 38 is connected to the top of the bubble column reactor 30 so as to cool down the unreacted synthesis gas and the gaseous hydrocarbon product, returns the unreacted synthesis gas to the bubble column reactor 30, and cools down the gaseous hydrocarbon product into a liquid. The first fractionator 40 distills the liquid hydrocarbons supplied via the separator 36 and the vapor-liquid separator 38 from the bubble column reactor 30, and separates and refines the liquid hydrocarbons into individual fractions according to boiling points.

Among them, the bubble column reactor 30 functions as an FT synthesis reactor which synthesizes hydrocarbons by the FT synthesis reaction between the synthesis gas and the slurry having solid catalyst particles suspended in a liquid.

As shown in FIG. 4, the bubble column reactor 30 includes the reactor body 30a which contains the slurry S, the inflow port 30b which is provided at one end of the reactor body 30a and allows the synthesis gas G to flow into the slurry S therethrough, the outflow port 30c which is provided at the other end of the reactor body 30a and allows the hydrocarbons to flow out therethrough from the reactor body 30a, and a demister 30d which is provided between the outflow port 30c and the liquid surface of the slurry S within the reactor body 30a to capture the catalyst particles passing therethrough. In the reactor body 30a, the inflow port 30b is disposed at the bottom, and the outflow port 30c is disposed at the top. For example, the synthesis gas G from which a carbon dioxide gas is removed is supplied to the inflow port 30b from the $CO_2$ removal unit 20, and the aforementioned vapor-liquid separator 38 is connected to the outflow port 30c.

In addition, the slurry S mainly includes liquid hydrocarbons which are produced by the FT synthesis reaction with the catalyst particles, and the liquid hydrocarbons include a wax fraction which is solidified at a specific temperature or lower. Further, in this embodiment, the demister 30d has, for example, a structure in which a number of minute connected spaces are formed by knitting thin metallic wires.

Further, the synthesis gas G made to flow into the slurry S by the aforementioned flow rate control device 33 is evaluated by a gas superficial velocity hereinafter.

Figure 5:
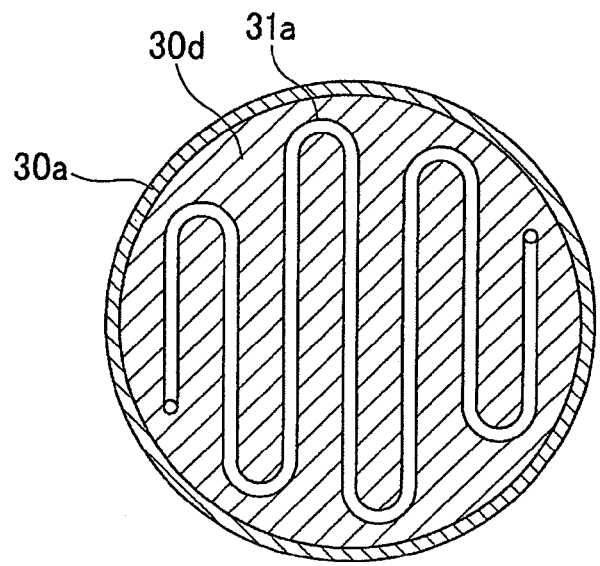
FIG. 5 is a sectional view taken along a cutting line A-A in FIG. 4.

In this embodiment, as shown in FIGS. 3 to 5, the demister 30d includes a heating device 31 having a heating tube 31a which is disposed so that at least a part thereof meanders within the demister 30d, and the vapor-liquid separator (heating medium flowing device) 34 which supplies a steam (heating medium) heating the heating tube 31a into the heating tube 31a.

In this bubble column reactor 30, the synthesis gas G that is a source gas is supplied in the form of bubbles from the inflow port 30b of the bubble column reactor 30, and passes through the slurry S, and in a suspended state, a hydrogen gas and a carbon monoxide gas undergo a synthesis reaction, as shown in the above chemical reaction formula (3).

The FT synthesis unit 5 produces liquid hydrocarbons by the FT synthesis reaction from the synthesis gas produced by the synthesis gas production unit 3.

Specifically, as shown in FIG. 4, the synthesis gas G from which the carbon dioxide gas is separated in the $CO_2$ removal unit 20 flows into the inflow port 30b provided at the bottom of the reactor body 30a of the bubble column reactor 30 through the flow rate control device 33, and rises in the form of bubbles through the liquid slurry S contained within the reactor body 30a. At this time, within the reactor body 30a, the carbon monoxide gas and hydrogen gas which are included in the synthesis gas G react with each other by the above-described FT synthesis reaction, thereby producing gaseous or liquid hydrocarbons. Further, the gas superficial velocity of the synthesis gas G is adjusted by the flow rate control device 33 so as to be a predetermined value in the range of 0.04 msec or more and 0.3 m/sec or less. In addition, it is more preferable that the gas superficial velocity is 0.1 msec or more and 0.2 msec or less.

The catalyst particles included in the slurry S fly upward out of the liquid surface of the slurry S together with minute liquid droplets which are generated when the bubbles composed of the unreacted synthesis gas G which has not reacted within the slurry, the synthesized gaseous hydrocarbons, and the like burst, and pass through the minute spaces formed in the demister 30d. At this time, although the gas such as the synthesis gas G and the gaseous hydrocarbons passes through the minute spaces, the liquid droplets or the solid catalyst particles included therein are captured by the demister 30d. Further, the slurry S which has become minute liquid droplets may adhere to the demister 30d, and a part thereof may be solidified as the heat thereof is lost. Here, when the demister 30d is heated to a specific temperature or higher at which the solidified component of the slurry S is melted, by the heating tube 31a in which a steam flows, the slurry S which has become comparatively large liquid droplets returns to the liquid slurry S contained within the reactor body 30a.

Moreover, by flowing boiler feed water (BFW) through the heat transfer tube 32 of the bubble column reactor 30 at the time of this synthesis reaction, the reaction heat of the FT synthesis reaction is removed, and the water heated by this heat exchange is vaporized into a steam. As for this steam, the water liquefied in the vapor-liquid separator 34 may be returned to the heat transfer tube 32, and a gas component may be supplied to an external device, such as the above heating tube 31a, as a medium-pressure steam (for example, 1.0 to 2.5 MPaG).

The liquid hydrocarbons synthesized in the bubble column reactor 30 in this way are extracted from the middle part of the bubble column reactor 30, and are brought into the separator 36. The separator 36 separates a catalyst (solid component) and a liquid component including a liquid hydrocarbon product in the extracted slurry. A part of the separated catalyst is supplied to the bubble column reactor 30 as slurry together with liquid hydrocarbons, and the liquid component is supplied to the first fractionator 40. Further, the unreacted synthesis gas, and the gas component of the synthesized hydrocarbons are introduced into the vapor-liquid separator 38 from the outflow port 30c provided at the top of the bubble column reactor 30. The vapor-liquid separator 38 cools down these gases to separate liquid hydrocarbons condensed as a part of the liquid to introduce them into the first fractionator 40. Meanwhile, as for the gas component separated in the vapor-liquid Separator 38, the unreacted synthesis gas (CO and $H_2$) is returned to the bottom of the bubble column reactor 30, and is reused for the FT synthesis reaction. Further, the emission gas (flare gas) other than the products, which contains as the main component hydrocarbon gas having a small carbon number ($C_4$ or less), is used for fuel gas of the reformer 12, or is introduced into an external combustion facility (not shown), is combusted therein, and is then emitted to the atmosphere.

As such, according to the bubble column reactor 30 of the second embodiment of the present invention, the synthesis gas G, which has flowed into the liquid slurry S within the reactor body 30a from the inflow port 30b provided at the bottom of the reactor body 30a, is turned into the gaseous and liquid hydrocarbons by the FT synthesis reaction with the catalyst particles included in the slurry S while rising within the slurry S in the form of bubbles. Here, some of the catalyst particles may fly upward toward the top from the liquid surface of the slurry S together with the synthesis gas G which has not reacted within the slurry S, the gaseous hydrocarbons which have been synthesized within the slurry, or the like. However, since the demister 30d is provided between the slurry S and the outflow port 30c, the catalyst particles are captured by the demister 30d upon passing through the inside of the demister 30d. Accordingly, it is possible to suppress the catalyst particles from being entrained into the hydrocarbons flowing out of the outflow port 30c, and it is possible to improve the quality and yield of the hydrocarbons as a product.

Further, since the demister 30d includes the heating device 31 having the heating tube 31a and the vapor-liquid separator 34, even when a part of the slurry S adheres to the demister 30d and the wax fraction included in the hydrocarbons of the slurry is cooled down and solidified, the solidified component of the slurry S may be heated and melted by the heating device 31 so as to be dropped and returned into the slurry S contained within the reactor body 30a. Accordingly, it is possible to prevent the slurry S from being solidified in the demister 30d to block the demister and to prevent the flow of the gaseous hydrocarbons from being stopped. This can improve the operation rate of the bubble column reactor 30.

Further, since a part of the heating tube 31a is disposed within the demister 30d, it is possible to make a heating steam flow into the heating tube 31a to further reliably heat the demister 30d. By flowing the steam heated within the heat transfer tube 32 and separated in the vapor-liquid separator 34 into the heating tube 31a, it is possible to efficiently heat the demister 30d without generating a new heating medium using electrical power or the like.

Further, the gas superficial velocity is adjusted by the flow rate control device 33 so as to be a predetermined value in the range of 0.04 m/sec or more and 0.3 m/sec or less. Since the velocity of the hydrocarbons flying upward out of the liquid surface of the slurry S is suppressed by setting the gas superficial velocity to be 0.3 m/sec or less, it is possible to further reliably suppress the catalyst particles from being entrained into the hydrocarbons flowing out from the outflow port 30c. Further, since the gas superficial velocity is set to be 0.04 m/sec or more, it is possible to prevent the accumulation of the catalyst within the reactor body 30a due to the precipitation of the catalyst particles downward in the slurry, and thus to prevent the deterioration of the efficiency of the chemical reaction between the synthesis gas G and the slurry S.

The results obtained by measuring the amount of the catalyst particles flowing out of the outflow port 30c of the reactor body 30a using the bubble column reactor 30 of the liquid-fuel synthesizing system 1 according to the above embodiment will be described. Table 2 shows test results in a case where the internal diameter of the cylindrical middle part of the reactor body 30a was 250 mm.

In the example and the comparative example, the outflow amount of the catalyst particles was measured when the distance in the vertical direction between the liquid surface of the slurry S and the outflow port 30c was set to a fixed value of 0.7 m, and the bubble column reactor 30 was operated for a predetermined period of time.

TABLE 2

|  | Working example | Comparative example |
|---|---|---|
| Demister | Provided | Not provided |
| Distance (m) | 0.7 | 0.7 |
| Operation time (h) | 396 | 72 |
| Outflow amount of catalyst particle (g) | 0.09 | 6.3 |
| Outflow amount of catalyst particle per unit time (g/h) | 0.00023 | 0.0875 |
| Concentration of catalyst in liquid hydrocarbon supplied to first fractionator (wt. ppm) | 0.03 | 50 |

As shown in the working example, when the demister 30d was provided between the liquid surface of the slurry S and the outflow port 30c, it was found that the outflow amount of the catalyst particles per hour was 0.00023 g/h. On the contrary, as shown in the comparative example, when the demister 30d was not provided, the outflow amount was increased up to 0.0875 g/h, which was several hundred times larger than that of the case where the demister 30d was provided. When the measurement results and the calculation results are converted into the concentration of the catalyst in the liquid hydrocarbons supplied to the first fractionator 40 from the bubble column reactor 30, it was found that the concentration was 0.03 wt. ppm when the demister 30d was provided and was 50 wt. ppm when the demister 30d was not provided.

Although the second embodiment of the present invention has been described hitherto in detail with reference to the drawings, concrete configurations are not limited to the embodiments, and the present invention also includes changes in configuration without departing from the spirit of the present invention.

For example, in the second embodiment, the steam separated in the vapor-liquid separator 34 is allowed to flow through the heating tube 31a, but the steam obtained by separate steam generating device may be allowed to flow therethrough.

Further, in the second embodiment, the heating device 31 including the heating tube 31a and the vapor-liquid separator 34 is used, but a heater or the like may be used as the heating device.

Further, in the second embodiment, the demister 30d may not be provided with the heating device 31. This is because the slurry S is not required to be heated and melted so as to be dropped from the demister 30d when the demister 30d is sufficiently large with respect to the amount of the adhered slurry S.

Further, in the second embodiment, the demister 30d is formed by knitting the thin metallic wires. However, for example, the demister 30d may have a structure in which a flow passage having a labyrinth shape or a louver shape is formed by the combination of plates so as to allow the gaseous hydrocarbons to pass therethrough, and the catalyst particles flying upward out of the slurry S are captured.

INDUSTRIAL APPLICABILITY

According to the bubble column reactor and the control method thereof, it is possible to suppress the catalyst particles from being mixed into gaseous hydrocarbons flowing out of the bubble column reactor.

DESCRIPTION OF REFERENCE NUMERALS

30: BUBBLE COLUMN REACTOR
30a: REACTOR BODY
30b: INFLOW PORT
30c: OUTFLOW PORT
30d: DEMISTER
31: HEATING DEVICE
31a: HEATING TUBE
34: VAPOR-LIQUID SEPARATOR (HEATING MEDIUM FLOWING DEVICE)
39: LIQUID LEVEL GAUGE
G: SYNTHESIS GAS
S: SLURRY

The invention claimed is:

1. A bubble column reactor comprising:
a reactor body which contains a slurry having solid catalyst particles suspended in a liquid;
an inflow port which is provided at the bottom of the reactor body and allows a synthesis gas including carbon monoxide gas and hydrogen gas as the main components to flow into the slurry therethrough;
an outflow port which is provided at the top of the reactor body and allows gaseous hydrocarbons synthesized by a chemical reaction between the synthesis gas and the slurry, an unreacted synthesis gas, and the like to flow out therethrough;
a demister which is disposed between the liquid surface of the slurry within the reactor body and the outflow port so as to capture the catalyst particles passing therethrough;
a heat transfer tube which is disposed in the reactor body so as to contact the slurry; and
a heating device configured to heat the demister, wherein
the heating device includes a heating tube of which at least part is disposed within the demister and a vapor-liquid separator configured to supply a heating medium into the heating tube, wherein
the vapor-liquid separator connects with the heat transfer tube and the heating tube, and is configured to separate coolant water flowing through the heat transfer tube into steam, by heat exchange between the slurry and the water, and a liquified water, to supply the separated steam into the heating tube as the heating medium, and to supply the separated liquified water into the heat transfer tube.

2. The bubble column reactor according to claim 1, further comprising a flow rate control device configured to adjust a gas superficial velocity of the synthesis gas flowing into the inflow port therethrough of 0.04 to 0.3 m/sec.

3. The bubble column reactor according to claim 1, wherein the distance in a vertical direction between the liquid surface of the slurry and the outflow port is 1.4 to 10 m.

4. The bubble column reactor according to claim 1, wherein the heating tube is disposed in a meandering manner within the demister.

5. The bubble column reactor according to claim 1, wherein the demister has a structure formed by knitting together thin metallic wires.

\* \* \* \* \*